United States Patent [19]

Schwartz, Jr.

[11] Patent Number: 5,366,998

[45] Date of Patent: * Nov. 22, 1994

[54] COMPOSITION FOR REMOVING ADHESIVES FROM POLYMERIC FILM AND PROCESS FOR USING SAME

[75] Inventor: John A. Schwartz, Jr., Spartanburg, S.C.

[73] Assignee: Partek, Inc., Duncan, S.C.

[*] Notice: The portion of the term of this patent subsequent to Feb. 15, 2011 has been disclaimed.

[21] Appl. No.: 34,255

[22] Filed: Mar. 22, 1993

Related U.S. Application Data

[63] Continuation-in-part of Ser. No. 855,075, Mar. 23, 1992, Pat. No. 5,286,463.

[51] Int. Cl.$^5$ .......................... C08J 11/04; B03B 1/00
[52] U.S. Cl. ..................................... 521/40; 521/40.5; 521/46; 521/48; 521/48.5
[58] Field of Search ................. 521/40, 40.5, 46, 48, 521/48.5

[56] References Cited

U.S. PATENT DOCUMENTS

| | | |
|---|---|---|
| 1,350,157 | 8/1920 | Horton . |
| 1,448,475 | 3/1923 | Weisberg . |
| 1,637,990 | 8/1927 | Ellis et al. . |
| 2,503,104 | 4/1950 | Farber . |
| 3,047,435 | 7/1962 | Wemple . |
| 3,503,904 | 3/1970 | Dietz et al. ............................ 521/46 |
| 3,647,422 | 3/1972 | Wainer . |
| 3,649,250 | 3/1972 | Dorenfeld et al. . |
| 3,652,466 | 3/1972 | Hittel et al. . |
| 3,873,314 | 3/1975 | Woo et al. ............................ 521/46 |
| 3,928,253 | 12/1975 | Thornton et al. . |
| 4,324,705 | 4/1982 | Seto et al. ............................ 521/48 |
| 4,392,889 | 7/1983 | Grout ............................ 521/48 |
| 4,585,561 | 4/1986 | Zlokarnik et al. . |
| 4,602,046 | 7/1986 | Buser et al. ............................ 521/40 |
| 4,612,057 | 9/1986 | Buser et al. . |
| 4,799,954 | 1/1989 | Hochberg . |
| 4,828,717 | 5/1989 | Deleeuw et al. . |
| 5,064,466 | 11/1991 | Hilton . |
| 5,120,768 | 6/1992 | Sisson ................................. 521/48 |

OTHER PUBLICATIONS

Item 20130, vol. 201, Jan. 1981, p. 28, Havant, Hampshire, GB, Disclosed by J. R. Celland et al., Silver Recovery and Polyester Recycling from Photographic Film Scrap.

Item 21524, vol. 215, Mar. 1982, p. 65, Havant, Hampshire, GB, Disclosed by P. J. Delmore et al., Silver Recovery from Silver Halide Emulsion Wastes.

Item 21231, Research Disclosure, Dec. 1981, Separation of Polyvinylidene Chloride Copolymer Coatings from Oriented Polyester Substrates.

Toyoaki, Method for Recovering Silver, Patent Abstracts of Japan, JP61034125, Feb. 18, 1986.

Primary Examiner—Paul R. Michl
Assistant Examiner—Olga Asinovsky
Attorney, Agent, or Firm—Dority & Manning

[57] ABSTRACT

A novel composition for use in reducing and recovering metals, such as silver, and for use in stripping adhesive polymer layers from various polymer bases, such as polyester, and processes for using same are provided. The composition and variations thereof can be useful in separating an adhesive polymeric layer from the film for recovery of either. The composition comprises a reducing sugar/alkaline solution that is particularly useful for recovering silver from polyester photographic film where a silver halide light-sensitive emulsion layer is adhered to the polyester film by a polymeric adhesive resin, such as resins containing copolymers of polyvinylidene chloride and polyvinyl chloride. Processes for separation and recovery are also disclosed and claimed.

20 Claims, No Drawings

COMPOSITION FOR REMOVING ADHESIVES FROM POLYMERIC FILM AND PROCESS FOR USING SAME

CROSS REFERENCE TO RELATED APPLICATION

This application is a continuation-in-part of application Serial No. 07/855,075, filed Mar. 23, 1992, now U.S. Pat. No. 2,286,463 in the United States Patent and Trademark Office.

FIELD OF THE INVENTION

A composition and process for removing adhesive polymers, particularly polyvinylidene halide and polyvinyl halide-based resins, from a polymeric base, particularly a polyester film, are provided.

BACKGROUND OF THE INVENTION

Polyethylene terephthalate (PET), or polyester as it is commonly known, has been widely used as a polymeric base material in a variety of applications, including photographic films, beverage containers, and recording tapes. In many of these various applications, the polymeric base is coated with various binders, adhesives, and metal compounds. For example, in photographic films, a polyester base is coated with an adhesive polymer layer formed from copolymers of polyvinylidene chloride and polyvinyl chloride, hereinafter referred to as "PVDC-based resin". The PVDC-based resin layer permits the adhesion of a light-sensitive emulsion layer to the polyester base. In photographic films, this light-sensitive emulsion layer is usually a silver halide dispersed in gelatin. PVDC-based resin is used to bond the emulsion to the polyester surface because gelatin does not bond sufficiently thereto. In other applications, a PVDC-based resin layer may be used in manufacturing polyester soda bottles and other polymeric articles.

Polyester film is being used in increasing amounts for photographic support, magnetic recording tapes, graphic arts materials, electrical insulation, and other applications requiring a clear, strong, dimensionally stable and chemically resistant film. Although other polymeric bases are utilized, polyester has become the standard film for photographic use and, in particular, for that type of film as described above which employs a silver halide dispersed in gelatin.

Although other polymeric adhesives may be utilized, most films presently employ polyvinylidene chloride resin or congeners thereof. PVDC-based resin adheres tightly to both the polyester surface and the silver halide gelatin emulsion. The PVDC-based resin layer is often called the "subbing" layer. Particularly, copolymers of polyvinylidene chloride and polyvinyl chloride or copolymers of polyvinylidene chloride and polyacrylonitrile are generally used as the subbing layer. The polyvinyl halide subbing layers are generally extremely thin, usually on the order of 1 mil in thickness and sometimes as thin as 0.1 mil or less.

Each year, millions of pounds of polyester and other polymeric bases are scrapped because the presence of the polyvinylidene chloride-based coating inhibits recovery of clean recyclable polymer. Due to problems in the manufacturing process, some of this polyester film never receives a silver halide layer. Instead the base is discarded with only the PVDC-based resin layer coated thereon. Moreover, many of pounds of X-ray and other photographic films are scrapped without recovering the valuable silver contained therein. It would, of course, be very desirable to convert scrap polyester into clean polyester and to convert the scrap films containing metals into a form from which the metals may be recovered. Recovery of silver from the halide emulsion provides both reusable silver and reduces solid waste disposal problems, while protecting our natural resources and environment from silver in waste streams.

A traditional method employed to recover silver from used photographic film is to incinerate the film and reclaim the silver from the ash by pyrometallurgical processing. As expected, the economics of this process are not favorable when silver prices are low.

Various other methods have been used in attempts to recover the silver and polymeric base material from both used ("black") and unused ("green") photographic film and scrap PVDC-based resin-coated PET. Many of the prior methods treat scrap photographic film with hot caustic solutions and/or various solvents. For example, U.S. Pat. Nos. 4,602,046 and 4,612,057 to Buser et al. describe methods for recovering silver and polyester from photographic film by employing an alkaline solution and high shear conditions. Likewise, U.S. Pat. No. 5,064,466 to Hilton shows the use of a stripping formulation having alkaline bleach solution in a process for recovering silver. As disclosed therein, the stripped solution containing silver, silver halide and animal protein is then treated with a strong or highly ionized acid resulting in the precipitation of hydrolyzed animal protein, silver and silver halide. U.S. Pat. No. 3,647,422 to Wainer employs a caustic bath solution, various mechanical rolling and scraping treatments, as well as electrolysis to recover silver and polyester from processed photographic film.

U.S. Pat. No. 3,652,466 to Hittel is directed to a process for recovering polyester utilizing a aqueous alkali solution to form a slurry from small pieces of scrap film. A classification column is used to separate the silver halide emulsion layer and the vinylidene chloride copolymer coating from the polyester pieces. Thereafter, the silver compounds are recovered from the emulsion and vinylidene chloride copolymer sludge.

Various solvents and other agents have also been employed to recover silver and polyester. Such agents include oxidizing agents such as potassium permanganate as described in U.S. Pat. No. 3,047,435 to Wemple, monoethanolamine as described in U.S. Pat. No. 3,928,253 to Thornton et al., and various polar aprotic solvents described in U.S. Pat. No. 3,873,314 to Woo et al.

Additionally, U.S. Pat. No. 3,649,250 to Dorenfeld et al. describes the recovery of silver from photographic film by converting the silver to silver cyanide and then recovering silver by the Merrill-Crow process. U.S. Pat. No. 4,392,889 to Grout and U.S. Pat. No. 4,828,717 to DeLeeuw et al. show other apparatus such as baths for recovering silver and/or plastic from photographic film.

A PVDC-based resin was first employed in the 1950's as the subbing layer for adhering silver halides to polyester. Prior to the use of PVDC-based resin to adhere metals to polymeric bases, various reducing agents had been employed to reduce silver to a recoverable form from various silver-containing solutions and silver-containing cellulosic papers. For example, U.S. Pat. No. 1,448,475 to Weisberg discloses the use of an ordinary sugar to precipitate silver from a sodium thiosulfate solution. The silver sodium thiosulfate solution described therein had been created by washing the silver salt from photographic plates. U.S. Pat. No. 2,503,104 to Farber describes the use of a hydrolyzed sugar solution obtained from wood and a caustic solution to reduce and recover silver from various photographic solutions. As described therein, silver is precipitated from spent photographic solution by heating the solution to its boiling point, rendering it alkaline, and reducing the silver by using organic reducing agents. U.S. Pat. Nos. 1,350,157 to Horton and 1,637,990 to Ellis disclose methods for recovering silver and camphor from cellulosic products, including waste photographic film, by treating with an alkali solution and various solvents which cause the silver to be precipitated out.

Although various reducing sugars have been used to recover silver, such sugars were used to reduce silver after it was in a solution, not to recover silver directly from a solid base. None of the previously-mentioned patents employing reducing sugars solved the problem of removing silver halides bound to a polymer-base film by a polyvinylidene halide subbing layer.

One current commercial process for recovering silver and/or polyester from used or unused photographic film employs the following steps: (1) grinding film into small chips; (2) adding an enzyme to the ground film to decompose the gelatin and liberate the silver from the silver halide emulsion; (3) adding sodium borohydride to reduce the silver from the silver halide emulsion after separating the film therefrom; (4) adding a coagulant to coagulate metallic silver and allowing it to settle into a sludge; and (5) roasting the sludge to remove organics and obtain metallic silver. In addition, caustic potash or soda may be added to the enzymatic and reduction reactions to maintain the pH as necessitated by the particular reagents.

This process suffers from the fact that sodium borohydride is very expensive (sodium borohydride is currently priced at about $25.00 per pound), thus rendering the process uneconomical, especially when silver prices are low. Furthermore, the process often results in fires and creates other safety concerns due to its hazardous reaction steps. The process also produces an abnormally large amount of fines from which the PVDC-based resin-adhered silver has not been removed. Fines include small particles of polyester film that have not been stripped of the silver halide. Fines disposal increases costs as well as increases potential for harm to the environment caused by their burning. Moreover, the resulting roasted silver powder is only about 60% to 80% pure silver.

Although various agents and processes are known to separate silver, PVDC-based resin, and polyester, the particular features of the present invention are absent from the art. The prior art is generally deficient in affording a caustic/reducing sugar composition that removes the PVDC-based resin layer while, at the same time, reduces the silver to obtain metallic silver from photographic film. Moreover, the prior art does not suggest a composition or process as described herein for removing PVDC-based resin from non-silver-containing polyester or for reducing metals attached as metal halides to a substrate. The present invention overcomes the shortcomings of the prior art in that the composition and process disclosed herein result in lower processing costs, less hazardous operational procedures, and increased yields and purity of silver recovered from various PVDC-based resin-layered films and other substrates.

SUMMARY OF THE INVENTION

It is an object of the present invention to provide a composition for recovering metals from a polymer base where the metal is bound to the base by a polymeric adhesive.

It is an object of the present invention to provide a composition and process for recovering silver from a substrate in metallic form.

It is another object of the present invention to provide a composition for recovering silver from a polyester substrate having the silver attached thereto by a polyvinyl-based halide layer.

It is another object of the present invention to provide a composition for removing a polyvinyl-based halide adhesive layer from a polymeric base.

It is a further object of the present invention to provide a composition employing an alkali/reducing sugar solution to effect silver recovery.

It is an object of the present invention to provide a process for recovering metals from a polymer base where the metal is bound to the base by a polymeric adhesive.

It is further another object of the present invention to provide a composition and process for recovering silver from scrap photographic film.

It is another object of the present invention to provide a composition for removing a polyvinyl-based halide adhesive layer from a polymeric base.

It is another object of the present invention to provide a process for recovering silver from a film where the silver is adhered to the film by a polyvinyl-based halide layer.

It is further another object of the present invention to provide an economical and efficient process for recovering silver from PVDC-based resin-layered film.

Still another object of the present invention is to provide a process wherein silver and PVDC-based resin may be removed from polyester-based material simultaneously.

Generally speaking, the present invention is directed to a composition and process for recovering metals, particularly silver, from polymeric adhesive-layered polymer bases, particularly photographic film, in a one-step process. The process eliminates the need for an expensive reducing agent such as sodium borohydride. The composition operates at a high pH in order to remove the PVDC-based resin layer from the photographic film while, at the same time, reducing the silver halide and providing for recovery of metallic silver.

Broadly speaking, the present composition comprises a reducing sugar, such as fructose, in an alkaline solution. Various surfactants and other agents may be added thereto to ensure that the PVDC-based resin removed from the film is not redeposited on the film during the process. The present process involves adding the instant composition to chopped photographic film, either green or black, or any other PVDC-based resin-layered substrate. The pH of the slurry is then raised to above 9 and heat is applied to maintain the temperature at about 80° C. to about 105° C. until the PVDC-based resin has been stripped and the metal halide has been reduced to metallic form. The pH of the system is then lowered to less than 9 so that PVDC-based resin precipitates. The emulsion containing the silver is then separated from the film and coagulated with known coagulants to settle out silver that may be recovered.

In another particular embodiment of the present invention, a composition as described herein may be employed to remove the polymeric adhesive layer from a polymer base which does not have a metal halide emulsion adhered thereto. In such an embodiment, the process and composition described herein allow for recovery of clean, recyclable polyester from such scrap adhesive-layered waste.

In addition, the present inventive composition and process may be used to recover silver from a substrate, such as cellulosic paper, having a metal halide layer attached thereto.

DESCRIPTION OF PREFERRED EMBODIMENTS

By way of example only, the process of recovering silver from photographic film having silver bound thereto by a PVDC-resin layer is described. Initially, silver-layered scrap photographic film is added to a solution of weak alkali (0.5% –5.0%), a surfactant, a reducing sugar such as fructose or sucrose, and water. The pH of the slurry is adjusted to above 9 and, preferably, about 12. The slurry is then heated to about 90° C. for about an hour while mixing. After heating, the pH is preferably reduced to about 8.5. A lowering of the pH is not required to remove the silver from the substrate, but the lower pH aids in effective silver recovery. The liquid is removed and the PVDC-based resin layer is separated from the film as a colloidal suspension. A coagulant is used to precipitate silver which is then dried, roasted, and utilized for further applications.

By employing the present composition, silver may be recovered from photographic film in a one-step process. In the inventive process, the novel composition strips the PVDC-based resin layer from the polymer base while simultaneously reducing the silver adhered to the PVDC-based resin layer. During recovery, various agents in the composition prevent redeposition of the PVDC-based resin layer onto the polymer base.

In another particular embodiment, the composition may be used for stripping PVDC-based resin from non-silver containing polyester. In such an embodiment, the reducing sugar is not required due to the absence of any metal halide to reduce.

However, in order to more efficiently remove the PVDC-based resin from the polyester, a reducing agent may be employed. When employed, reducing agents in general make the composition more effective in removing the PVDC-based resin from the polymeric resin. In particular, such reducing agents include the sugars described herein as well as other reducing agents such as sodium borohydride.

The present composition generally comprises a reducing sugar in an alkaline solution. In one particular embodiment, various other agents, including wetting agents, rinse aids, coupling agents, emulsifiers, solvents, and anti-redeposition surfactants may be added to the composition to improve its effectiveness in the metal recovery process. The choice among the various agents employed in certain embodiments of the present composition is not necessarily critical to the functioning of the silver recovery process. It should be understood that, although certain specific agents are used in the following examples, these agents are merely exemplary and one of ordinary skill in the art could employ various other equivalent agents to achieve equivalent compositions for recovering silver.

The present composition may be employed in a process to recover silver from photographic film according to the following steps. Initially, used or unused photographic film is ground into small flakes and loaded into a pulping or reaction vessel. A base such as caustic soda (sodium hydroxide) may be added in an amount so that the pH will be maintained at about 12 during the process (generally up to about 1 percent by weight of the entire slurry). The alkaline/reducing sugar composition is loaded into the reaction vessel in an amount of between about 0.5% and about 5.0% by weight. Water is added to the slurry to complete the weight percentages. A slurry bath of film chips and the above composition is formed and heated to about 90° C. for about 30 minutes to about 1 hour while mixing. High shear mixing is not required. The pH of the solution is then lowered to about 8.5 by adding an acid. After reduction of the pH, the liquid having the PVDC-based resin and reduced silver as a colloidal suspension is separated from the polyester chips using a separation apparatus such as a screen.

The recovered colloidal suspension/emulsion is then processed for further silver recovery. A coagulant such as a polyquaternary amine chloride sold under the name "Nalco 7135" or the various Hercules-brand coagulants is added to coagulate the silver at ambient temperature. Metallic silver settles out and the organic impurities may be burned therefrom to obtain a highly purified form of metallic silver. The polyester chips are dried to provide recyclable polymer base that is essentially free from PVDC-based resin.

The present composition may also be utilized to recover reusable and recyclable polyester from waste polyester having only a polymeric adhesive layer adhered thereto. In the manufacture of photographic film, some film is scrapped prior to attachment of the silver halide light-sensitive layer. Much of this waste film has already been coated with the PVDC-based resin. The present composition may be employed for removing the PVDC-based resin layer and obtaining usable polyester even when a metal is not present. In such a case, a reducing sugar is not necessary. However, a reducing agent, such as a sugar, may be employed to increase the effectiveness of the PVDC-based resin layer stripping. The same steps described above are utilized wherein the pH of the slurry is initially maintained above about 11 while heating in the presence of the inventive composition and is then lowered to about 8.5 to precipitate the PVDC-based resin. The PVDC-based resin is then separated from the polyester and a clean, recyclable polymer is obtained.

Although crystalline fructose is used in the Examples herein as the reducing agent, any equivalent reducing sugar such as fructose, sucrose, and other reducing polyhydroxy aldehydes and ketones could be employed. Sugars, or sacharrides, are generally classified as polyhydroxy aldehydes and ketones or as substances that hydrolyze to yield polyhydroxy aldehydes and ketones. Reducing sugars are those sugars that give positive oxidation tests in Tollens' or Benedict's solutions and are mono- or di-saccharides capable of reducing copper or silver salts in alkaline solutions. Generally, all carbohydrates containing a hemiacetal group or hemiketal group are classified as reducing sugars. Although the Examples herein show only the use of fructose as the reducing agent, it is to be understood that other reducing sugars such as glucose, fructose, dextrose, maltose, and the like may be employed.

Decyl alcohol with 6 moles of ethylene oxide is a wetting agent which allows sufficient penetration of the solution into and onto the photographic film. It is a member of the class of alcohol ethoxylates having an alcohol portion containing from 6 to 18 carbon atoms and an ethoxylate portion containing from 4 to 15 moles of ethylene oxide. Any suitable wetting agent may be employed in the present composition. Particular wetting agents include, but are not limited to, tridecyl alcohol with 6 moles of ethylene oxide, tridecyl alcohol with 10 moles of ethylene oxide, tridecyl alcohol with 8 moles of ethylene oxide, nonylphenol with 10 moles of ethylene oxide, and sodium dioctyl sulfosuccinate.

The ethylene oxide/propylene oxide blocked polymer utilized in the present composition is a rinse aid which assists in preventing the PVDC-based resin layer from redepositing onto the polymeric base after removal therefrom. Likewise, the decyl alcohol with 6 moles of ethylene oxide phosphate ester is another surfactant that prevents redeposition of the PVDC-based resin onto the polymeric surface. In the present process, when recovery of silver takes place at a pH of about 8.5, polyvinyl chloride-based resins are insoluble. The ethylene oxide/propylene oxide polymer and the ethylene oxide phosphate ester prevent redeposition of the insoluble PVDC-based resin onto the polymeric film. Although the present composition could be used to recover silver without employing a rinse aid and surfactant, excessive rinsing of the film would be required in order to remove sufficient PVDC-based resin for commercial reuse of the polymeric base.

Although the ethylene oxide/propylene oxide blocked polymer identified above is the preferred rinse aid, other equivalent rinse aids or antideposition materials may be substituted therefor. Any ethylene oxide/propylene oxide polymer containing from about 10% to about 40% by weight propylene oxide would suffice. For example, another rinse aid useful in the present composition is a polymer having a propylene oxide to ethylene oxide ratio of 10% to 90% and sold under the name "Pluronic L-61" by BASF Corporation.

Although the decyl alcohol/ethylene oxide phosphate ester described above is the preferred antideposition surfactant used in the present composition, the invention herein is not limited thereto. This component is generally a member of a class of surfactants including the mono- and diesters of the reaction products of phosphoric anhydride and alcohols that contain from 6 to 18 carbon atoms. More specifically, similar surfactants include the mono- and diesters of the reaction products of phosphoric anhydride and alcohol ethoxylates having an alcohol portion containing from 6 to 18 carbon atoms and an ethoxylate portion containing 4 to 15 moles of ethylene oxide.

Various coupling agents may be employed to increase the clarity, stability and consistency of the present composition. Exemplary coupling agents include sodium xylene sulfonate (SXS), tallow amine with 20 moles of ethylene oxide, and a tall oil fatty acid ester of polyethylene glycol.

Linear alkylbenzene sulfonates (LAS) are exemplary emulsifiers for PVDC-based resin. They function in the presence of d-limonene, which is a solvent for PVDC-based resin, to assist in removal of the PVDC-based resin layer and in prevention of redeposition onto the polymeric material after removal. Other alkylbenzene salts, including nonlinear sulfonates may also be employed. Generally such salts are mixtures of alkyl sulfonates having 8 to 20 carbon atoms with sodium dodecylbenzene sulfonate predominating in the mixture. Other solvents for PVDC-based resin such as tetrahydrofuran, cyclohexanone, and acetone may also be employed.

Although the specific percentages described herein are preferred, it is been found through further experimentation that a range of component concentrations may be utilized. Generally, it has been found that the range for the reducing sugar employed in the present composition is between about 0.1 mole to about 5.0 moles of reducing sugar for every mole of silver to be washed by the present composition. The utilizable range for each of the other components, excluding water, is in the range of between about 0.5% to about 50%. The cost of the components is generally the only limitation on the concentrations employed.

When determining the exact percentages of the various components other than sucrose and water, additional types or amounts are not detrimental to the operation of the present composition. In fact, additional surfactants, rinse aids, wetting agents, and the like will increase the effectiveness of the composition for recovering silver from photographic film and will especially assist in preventing redeposition of the PVDC-based resin onto the polymeric base after removal of the PVDC-based resin.

The present invention may be better understood by reference to the following examples.

EXAMPLE 1

A composition according the present invention was produced according to the following method. A mixture of 540 pounds of water and 800 pounds of crystalline fructose were charged to a mixing vessel and mixed until a clear solution was obtained. One hundred pounds of decyl alcohol with 6 moles of ethylene oxide (known as Ethal DA-6 sold by Ethox Chemicals), 100 pounds of an ethylene oxide/propylene oxide blocked polymer (known as Polyterg P-17A sold by Olin Chemicals), 100 pounds of sodium xylene sulfonate (known as SXS sold by Continental Chemical), 20 pounds of tallow amine with 20 moles of ethylene oxide (known as Ethfac TAM-20 sold by Ethox Chemicals), 10 pounds of a tall oil fatty acid ester of polyethylene glycol (known as PEG 400MO sold by Manufacturer's Soap & Chemicals), 15 pounds of linear alkylbenzene sulfonate (known as Conco AAS-985 sold by Continental Chemical), 30 pounds of d-limonene (sold by Florida Chemical Co.), and 100 pounds of decyl alcohol with 6 moles of ethylene oxide phosphate ester (known as Ethfac 161 sold by Ethox Chemicals) were added to the mixing vessel and agitated with the water/fructose mixture until a clear mixture was obtained. The pH of the solution was then adjusted to between about 6 to about 7 by addition of sodium hydroxide (25%) and the solution was mixed again until a clear solution was obtained.

The concentrations of the various components follow:

TABLE I

| Component | Concentration |
| --- | --- |
| water | 29.8% |
| fructose | 44.1% |
| DA-6 | 5.5% |
| P-17A | 5.5% |
| SXS | 5.5% |
| TAM-20 | 1.1% |

TABLE I-continued

| Component | Concentration |
|---|---|
| PEG 400MO | 0.6% |
| LAS | 0.8% |
| d-limonene | 1.6% |
| Ethfac 161 | 5.5% |

EXAMPLES 2-7

Other embodiments of the present composition were made according to the method of Example 1 with only listed components present and in the following weight percentage amounts:

TABLE II

| Component | Concentration |
|---|---|
| EXAMPLE 2: | |
| fructose | 50% |
| DA-6 | 25% |
| Pluronic L-61 | 25% |
| EXAMPLE 3: | |
| fructose | 75% |
| DA-6 | 12.5% |
| Pluronic L-61 | 12.5% |
| EXAMPLE 4: | |
| fructose | 47% |
| water | 31.7% |
| p17-A | 6% |
| DA-6 | 6% |
| TAM-20 | 1.2 |
| PEG 400MO | 0.5% |
| d-limonene | 1.8% |
| SXS | 5.8% |
| EXAMPLE 5: | |
| fructose | 61.8% |
| water | 15.4% |
| P17-A | 5.7% |
| DA-6 | 5.7% |
| TAM-20 | 1.1% |
| PEG 400MO | 0.9% |
| d-limonene | 1.7% |
| SXS | 7.7% |
| EXAMPLE 6: | |
| fructose | 48.6 |
| water | 12.1% |
| P17-A | 4.5% |
| DA-6 | 4.5% |
| TAM-20 | 0.9% |
| d-limonene | 1.3% |
| SXS | 6.0% |
| PEG 400MO | 0.7% |
| Ethfac 161 | 21.4% |
| EXAMPLE 7: | |
| fructose | 48.6% |
| Water | 12.1% |
| p-17A | 4.5% |
| DA-6 | 4.5 |
| TAM-20 | 0.9% |
| d-limonene | 1.3% |
| SXS | 6.0% |
| PEG 400MO | 0.7% |
| Conco AAS-985 | 21.4% |

EXAMPLE 8

Silver was recovered from undeveloped photographic film according to the present process by employing the composition of Example 1 as follows. Thirteen hundred and fifty gallons of water were charged to a mixing vessel and heat was applied through means of a water jacket surrounding the mixing vessel and further by injecting steam into the reaction vessel to maintain a temperature of about 95° C. One hundred fifty pounds of the composition made according to Example 1 was then charged to the reaction vessel. Thereafter, 4,878 pounds of green (unused) silver-containing PVDC-based resin-layered film was then charged into the mixing vessel. Seven hundred twenty pounds of sodium hydroxide (25%) was then charged to the mixing tank. The pH was checked and determined to be 11.45. Heating at about 90° C. to 95° C. was then maintained for about 1 hour. A sufficient amount of sulfuric acid (25%) was then added to the vessel to obtain a pH of 8.0. Sodium hydroxide (25%) was then added to the mixing vessel to raise the pH level to the preferred range of above 8.5 to about 8.56.

The slurried mixture was then provided to a screen so that the solid polyester film flakes were retained and the liquid containing the PVDC-based resin colloidal suspension was filtered therethrough. The flakes were then rinsed with water at about 65° C. and the flakes were provided to spin driers for drying. The silver/PVDC-based resin emulsion was then sent to a separate vessel whereupon an enzyme was added to further decompose the gelatin and Nalco 7135 was added as a coagulant so that metallic silver precipitated out of the suspension. The liquid from this vessel was then removed by decanting and metallic silver was obtained. The silver sludge was sent to a kiln and burned at about 425° C. to remove the organics from the metallic silver sludge. The metallic silver was then smelted into silver bars.

EXAMPLES 9-14

Each of the compositions made in Examples 2 to 7 was utilized to strip a PVDC-based resin and recover silver according to the process of Example 8. Each composition proved to be an effective composition for recovering silver and reusable film.

EXAMPLE 15

In a scale-up experimental test run on 62,000 pounds of silver-containing, PVDC-based resin film, the composition of Example 1 was used according to the process of Example 8. The resulting process produced 2500 pounds of fines. For a like amount of polyester, the current commercial process would result in 12,500 pounds of fines, an amount that is almost 5 times the amount produced when utilizing the present process.

Moreover, the coagulated sludge removed from the stripped film by the present inventive process contains from about 40% to about 50% silver. With the present commercial process, the reduced sludge contains about 15% to 25% silver after treating with sodium borohydride and settling out. Moreover, roasting in the present process yields about 90% to 95% silver powder whereas the current commercial process yields only about 65% to 75% pure silver powder.

EXAMPLE 16

Another embodiment of the present process relates to recovering metals from substrates having a metal halide layer attached thereto. One such substrate is a cellulosic paper, such as graphic arts paper, which contains silver halide without a PVDC-based resin layer. The current commercial process for removing the silver and obtaining it in pure form is to burn the paper very slowly to avoid flash ignition and loss of silver halide. The present composition may, instead, be employed at temperatures above about 50° C. to recover the metals from such substrates.

Graphic arts paper containing a silver deposit thereon was ground into small pieces about two millimeters square or less. A solution was formed containing 2% by weight of the composition of Example 1 and about 1% by weight caustic soda in water. This solution was sprayed directly onto the graphic arts paper. The paper was heated in an oven to a temperature of about 80° C. for about 5 to 10 minutes to effect silver reduction. The paper containing the reduced silver was then burned at high temperatures to obtain metallic silver.

EXAMPLES 17–27

Several runs of the process of Example 8 were conducted on varying amounts of undeveloped (green) x-ray film. In each of the runs, 150 pounds of the composition made according to Example 1 was used. In addition, to reach the initial pH listed below, 720 pounds of sodium hydroxide (25%) was utilized in each run. Varying amounts, as listed below, of sulfuric acid (25%) were used to lower the pH to between 8 and 9 as indicated below. In each run, the temperature of the mixing vessel was held at above 90° C. for one hour.

In each run, an acceptable level of PVDC-based resin remained on the covered film. The level of PVDC-based resin was deemed acceptable if the recovered polyester passed a "patty melt test". A patty melt test involves heating three or four flakes of the recovered film in a container until the flakes are melted. The presence of PVDC-based resin is confirmed if a brown residue remains after such heating. The runs were deemed acceptable if no such brown precipitant was observed.

TABLE III

| EXAMPLE NO. | GREEN FILM FLAKES (lbs.) | INITIAL pH | $H_2SO_4$ (25%) (lbs.) | FINAL pH |
|---|---|---|---|---|
| 17 | 4878 | 11.45 | 945 | 8.0 |
| 18 | 4835 | 11.65 | 864 | 8.7 |
| 19 | 4971 | 11.72 | 884 | 8.9 |
| 20 | 5115 | 11.49 | 945 | 8.4 |
| 21 | 5573 | | 662 | |
| 22 | 5739 | 11.80 | 823 | 8.9 |
| 23 | 5322 | 12.30 | 668 | 8.7 |
| 24 | 5690 | 12.30 | 651 | 8.9 |
| 25 | 5414 | 11.35 | 506 | 8.8 |
| 26 | 4532 | 12.57 | 715 | 8.9 |
| 27 | 5318 | 11.40 | 742 | 8.9 |

The percent reduction of pure silver versus the amount of silver halide on the polyester in Examples 17–27 was then determined. After the PVDC-based resin was stripped from the polyester flakes, and the silver halide was reduced, the silver emulsion was coagulated and the resulting sludge roasted at a temperature of about 595° C. for about 7 hours. Prior to roasting, a standard nitric acid digestion test was performed on the silver sludge to determine the amount of pure silver. The percent of silver reduced for Examples 17–18 when combined was 96.5%, for Examples of 19–21 when combined was 98.7%, for Examples 22–24 when combined was 98.8%, and for Examples 25–27 when combined was 95.6%. After roasting, the average purity of metallic silver obtained from all Examples 17 to 27 combined was 89%.

EXAMPLE 28

An assay of a centrifuged silver sludge tested prior to roasting showed a wet sample of the sludge containing both PVDC-based resin and silver having 40.22% total silver with 1.34% of the silver being present in a halide form. In this same sample, after drying to remove water, the sample demonstrated 57.63% total silver and 1.69% of the silver in a halide form. After roasting and burning off the PVDC-based resin, the silver powder showed 89.43% total silver with 1.7% of the total silver being in halide form.

This particular sample was then smelted into silver bars. Upon analysis of the silver bars, the silver therein was 99.41% pure with other impurities including iron at 0.090%, copper at 0.050%, lead at 0.050%, zinc at 0.020%, cadmium at 0.001%, and selenium at 0.001%.

EXAMPLE 29

As mentioned above, the present composition may be employed to strip the PVDC-based resin layer from a polymeric base where the PVDC-based resin layer does not contain a silver halide or other metal-containing layer. As described above, such PVDC-based resin-layered polyester film is generally generated as a waste product in the photographic film manufacturing process. In removing the PVDC-based resin layer from this unused film, the composition of Example 1 is employed, except that the reducing sugar may be omitted. Such a composition may contain the following components:

TABLE IV

| Component | Concentration |
|---|---|
| water | 67.4% |
| DA-6 | 6.7% |
| Ethfac 161 | 6.7% |
| P-17A | 6.7% |
| LAS | 6.7% |
| SXS | 4.3% |
| d-limonene | 1.3% |

To strip such a PVDC-based resin layer from the polyester base, a process identical to that described in Example 8 may be employed. Sufficient sodium hydroxide may be added to adjust the pH to produce an operationally safe and easily handled composition.

EXAMPLES 30–39

In each of the Examples listed in the table below, the composition described in Table IV and the process described in Example 8 were used to recover polyester from polyester film having a polymeric adhesive layer adhered thereto. The film did not contain a metal halide emulsion. In each Example, a varying amount of PVDC-based resin-containing flakes was stripped utilizing 150 pounds of the composition. Except for Examples 37, 38, and 39, the amount of sodium hydroxide (25%) employed to alter the pH was 722 pounds. In Example 37, 361 pounds of sodium hydroxide (25%) was employed and in Examples 38 and 39, 189 pounds of sodium hydroxide (25%) was employed. Table V further lists the amount of sulfuric acid (25%) employed to reduce the pH to between about 8 and 9. Furthermore, all of Examples 30–39 employed 7,090 pounds of water, except for Example 38 which utilized 9,990 total pounds of water. The temperature of the mixing vessel was held at above 90° C. for the times listed below. Each Example, except Example 38, exhibited an acceptable PVDC-based resin level when a patty melt test was preformed.

TABLE V

| EXAMPLE NO. | PVDC-BASED FILM (lbs.) | $H_2SO_4$ (25%) (lbs.) | TIME HEATED |
|---|---|---|---|
| 30 | 5000 | 1296 | 1 hr |
| 31 | 5000 | 945 | 1 hr |
| 32 | 5864 | 918 | 1 hr |
| 33 | 6935 | 850 | 1 hr |

TABLE V-continued

| EXAMPLE NO. | PVDC-BASED FILM (lbs.) | H$_2$SO$_4$ (25%) (lbs.) | TIME HEATED |
|---|---|---|---|
| 34 | 7361 | 823 | .75 hr |
| 35 | 6977 | 1147 | .5 hr |
| 36 | 7050 | 1039 | .5 hr |
| 37 | 7170 | 567 | .5 hr |
| 38 | 7100 | 230 | .5 hr |
| 39 | 5950 | 230 | 1 hr |

EXAMPLE 40

As described above in Examples 29–39, the present composition may be employed to strip the PVDC-based resin layer from a polymeric base where a metal-containing layer is not present. Although the reducing agent may be omitted as described above, the efficiency of the removal process is increased if a reducing agent, such as a reducing sugar or sodium borohydride, is employed.

An example of a composition for comparing to a formulation comprising a reducing agent contains the following components:

TABLE VI

| Component | Concentration |
|---|---|
| water | 76.0% |
| TDA-8 (tridecyl alcohol with 8 moles of ethylene oxide) | 4.9% |
| Pluronic L-61 | 4.9% |
| SXS | 4.9% |
| DDBSA (dodecylbenzene sulfonic acid) | 0.8% |
| d-limonene | 1.4% |
| PDA-6 (phosphated decyl alcohol with 6 moles of ethylene oxide) | 4.9% |
| TA-080 (a talloil fatty acid with 8 moles ethylene oxide obtained from Hoechst Celanese similar to PEG 400MO) | 0.4% |
| T-200 (a tallow amine with 20 moles ethylene oxide, identical to TAM-20) | 0.9% |

EXAMPLES 41–46

The composition having the components listed above in Table VI and an identical a composition comprising a reducing agent were compared for their ability to remove the PVDC-based resin layer from a polymeric film. The process used in removing the PVDC-based resin layer from the polymeric film was similar to that described hereinabove. In particular, an unsilvered polymeric film with a PVDC-based resin layer adhered thereto (100 grams) was added to 500 grams of water in a reaction vessel. Eight grams of the composition described in Table VI was then added and the pH raised above about 9 by the addition of sodium hydroxide (50%) solution thereto (about 5 grams). As exemplified in Table VII below, certain of the examples employed a reducing agent, either a reducing sugar (fructose) or sodium borohydride. Others did not employ a reducing agent.

The reaction vessel was heated to about 90° C., agitated, and held for the time period shown in Table VII. Thereafter, the pH was neutralized with the amount of sulfuric acid (10%) as shown in Table VII. Two types of film were employed for the tests-(1) a post-industrial undeveloped desilvered film that had been washed of its metal was employed in Examples 41 and 42; and (2) a post-consumer developed desilvered film was employed in Examples 43–46.

TABLE VII

| Example No. | Amount of Reducing Agent | Time Held at 90° | Amount H$_2$SO$_4$ (10%) (gms) |
|---|---|---|---|
| 41 | None | 1 hr. | 31 |
| 42 | 1 g fructose | 1 hr. | 26 |
| 43 | None | 1 hr. | 27 |
| 44 | 1 g fructose | 30 min. | 20 |
| 45 | None | 30 min. | 27 |
| 46 | .3 g sodium borohydride | 30 min. | 30 |

In Examples 41, 43, and 45, the resulting washed film indicated unsatisfactory levels of PVDC-based resin layers remaining when a patty-melt test was run. In Example 46, wherein sodium borohydride was used as the reducing agent, the PVDC-based resin was washed from the film but not as effectively as in the processes of Examples 42 and 44 wherein the reducing agent employed was a sugar (fructose). Accordingly, the employment of reducing agents, such as sugars and sodium borohydride, act to increase the amount of PVDC-based resin layer effectively removed by the inventive process. However, the use of a reducing sugar such as fructose, glucose, or other sacchirides act to substantially improve the process.

EXAMPLE 47

In addition, the process described herein may operate at lower temperatures than those described hereinabove. In particular, removal of PVDC-based resin may occur at 70° C. under certain conditions. Particularly, a composition having a 90 percent portion of the composition described in Table I hereinabove in conjunction with a 10 percent portion of a wetting agent such as tridecyl alcohol with 6 moles of ethylene oxide may be employed. In this lower temperature process, the addition of the surfactant with the composition described in Table I acts to lower the cloud point of the wash liquor and, therefore, allows washing at lower temperatures. The process as described in Example 8 is employed except that the temperature of the vessel is maintained for about two hours at about 70° C.

Twenty-five hundred gallons of water was added to the reaction vessel and heat applied. Then 420 pounds of the solution described above (90 percent of the composition in Table I and 10 percent tridecyl alcohol with 6 moles of ethylene oxide) was added and agitation begun. Next, 420 pounds of sodium hydroxide (50%) was added and the pH adjusted to between about 9 and 10. Thereafter, 10,000 pounds of black (used) x-ray film was added and the pH checked to ensure that it was 11.5 or greater. Heating continued until 70° C. was reached and the temperature held was for two hours. Afterwards, sulfuric acid (25%) was added until the pH of the mixture was between about 8.5 and 9.5. The washed polymeric film with the adhesive layer removed was then rinsed and separated from the vessel.

It will be understood that the invention is not limited to recovery of silver from polyester film but is useful for recovery of other metals from substrates other than polymer films having different plastic base materials coated with adhesive polymers and metals. It should also be understood that the present invention is not limited to the specific compositions or processes described herein, and that any composition having a formula equivalent to that described falls within the scope of the present invention. Preparation routes of the composition and process steps for the recovery of silver are merely exemplary so as to enable one of ordinary skill in the art to make the composition and use it according to the present process. It will be understood also that while the form of the invention shown and described herein constitutes a preferred embodiment of the invention, it is not intended to illustrate all possible forms of the invention. The words used are words of description rather than of limitation. Various changes and variations may be made to the present invention without departing from the spirit and scope of the following claims.

What is claimed is:

1. A process for separating an adhesive polymeric resin, from a polymeric film, where said adhesive resin is adhered to said polymeric film, said process for separating comprising the steps of:
   (a) providing said polymeric film with said adhesive polymeric resin adhered thereto to a slurry within a reaction vessel;
   (b) adding a base to said reaction vessel to adjust the pH of said slurry above about 9 to remove said adhesive polymeric resin from said polymeric film;
   (c) adding an anti-redeposition surfactant to said reaction vessel in an amount sufficient to prevent adhesive polymeric resin from being redeposited onto said polymeric film;
   (d) adding an acid in an amount sufficient to adjust the pH of said slurry to below about 9 to precipitate said resin from said slurry; and
   (e) separating said film from said precipitated adhesive polymeric resin and said slurry.

2. The process of claim 1 further comprising the step of heating said slurry when said acid is added so that said heat assists in separating said resin from said polymeric film.

3. The process of claim 2 wherein said heat is employed at a temperature of up to about 70° C.

4. The process of claim 2 wherein said heat is employed at a temperature within the range of from about 70° C. to about 105° C.

5. A process for stripping an adhesive polymeric resin from a polymeric film, said process comprising the steps of:
   (a) providing said polymeric film to a reaction vessel;
   (b) adding a reducing agent selected from the group consisting of reducing sugars and sodium borohydride to said reaction vessel to form a slurry therein;
   (c) heating said slurry to a temperature within the range of from about 70° C. to about 105° C;
   (d) adding a base to said reaction vessel in an amount sufficient to adjust the pH of said slurry to above about 9 so that said adhesive polymeric resin is released from said polymeric film;
   (e) adding an acid to said reaction vessel in an amount sufficient to adjust the pH of said slurry to below about 9 to precipitate said adhesive polymeric resin from said slurry; and
   (f) separating said film from said precipitated adhesive polymeric resin and from said slurry.

6. The process of claim 5 comprises the further step of adding an anti-redeposition surfactant to said slurry prior to adding said acid.

7. The process of claim 5 wherein said polymeric film provided to said reaction vessel contains a metal adhered thereto by said adhesive polymeric resin.

8. The process of claim 7 wherein said metal is silver.

9. The process of claim 1, wherein said anti-redeposition surfactant comprises an ethoxylated alcohol.

10. The process of claim 1, wherein said anti-redeposition surfactant is an ethoxylated alcohol having an alcohol portion containing from 6 to 18 carbon atoms and an ethoxylate portion containing from 4 to 15 moles of ethylene oxide.

11. The process of claim 1 comprising the further step of adding an emulsifier to said slurry prior to adding said acid.

12. The process as defined in claim 1, wherein said emulsifier is a sulfonate.

13. The process of claim 1, wherein said polymeric film provided to said reaction vessel has a metal adhered thereto by said adhesive polymeric resin.

14. The process of claim 1 wherein said acid is added in an amount sufficient to adjust the pH of said slurry to between 8 and 9.

15. The process of claim 6, wherein said anti-redeposition surfactant comprises an ethoxylated alcohol.

16. The process of claim 6, wherein said anti-redeposition surfactant is an ethoxylated alcohol having an alcohol portion containing from 6 to 18 carbon atoms and an ethoxylate portion containing from 4 to 15 moles of ethylene oxide.

17. The process of claim 5, wherein said acid is added in an amount sufficient to adjust the pH of said slurry to between 8 and 9.

18. A process for stripping an adhesive polymeric resin, said process comprising the steps of:
   (a) providing said polymeric film to a reaction vessel;
   (b) adding a reducing sugar to said reaction vessel at a temperature of at least about 70° C. to form a slurry of said reducing sugar and said polymeric film;
   (c) adding a base to said reaction vessel is an amount sufficient to separate said adhesive polymeric resin from said polymeric film;
   (d) adding an acid to said reaction vessel in an amount sufficient to precipitate said adhesive polymeric resin from said slurry but insufficient to adjust the pH of said slurry below about 8; and
   (e) separating said film from said precipitated adhesive polymeric resin and from said slurry.

19. The process of claim 1 comprising the further step of adding to said reaction vessel a reducing agent selected from the group consisting of reducing sugars and sodium borohydride 20. The process of claim 1 wherein said slurry in said reaction vessel to which said film is added comprises a reducing sugar.

* * * * *